June 30, 1936.  F. B. YINGLING  2,045,816
SUPERCHARGER SYSTEM
Filed March 16, 1933  2 Sheets-Sheet 1
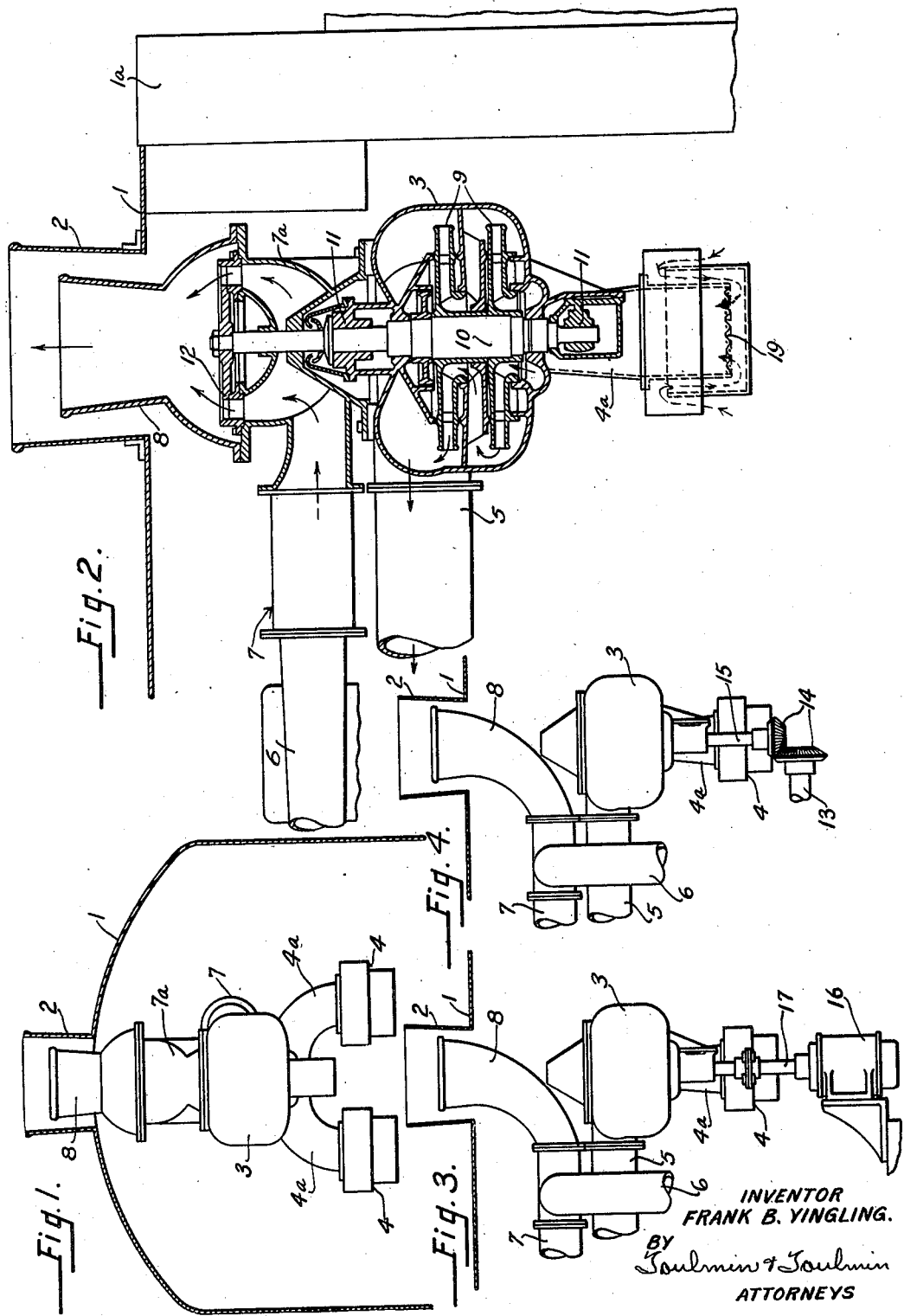
INVENTOR
FRANK B. YINGLING.
BY Toulmin & Toulmin
ATTORNEYS

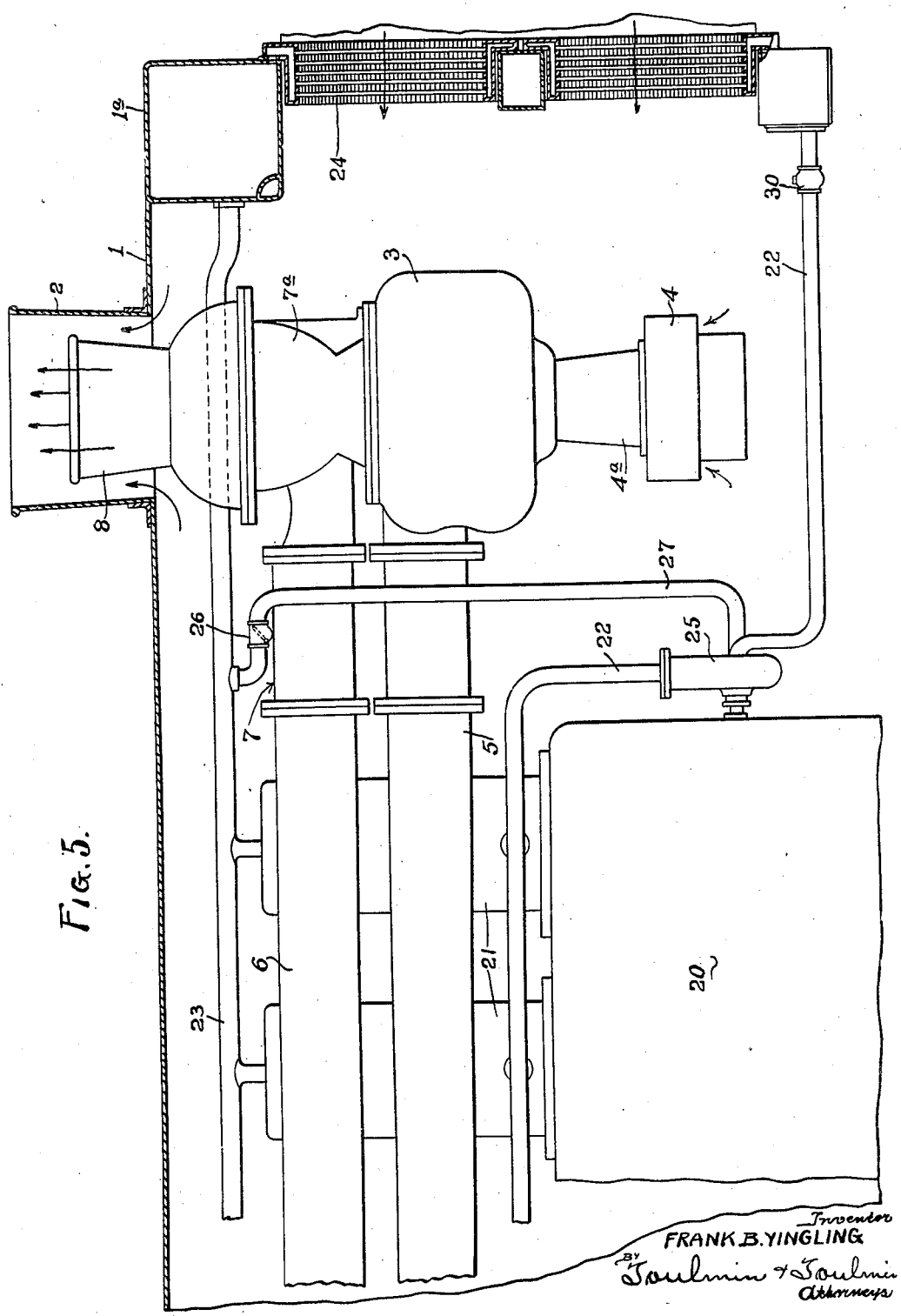

Patented June 30, 1936

2,045,816

UNITED STATES PATENT OFFICE 2,045,816

SUPERCHARGER SYSTEM

Frank B. Yingling, Hamilton, Ohio, assignor to Cyrus J. Fitton, Hamilton, Ohio

Application March 16, 1933, Serial No. 661,103

4 Claims. (Cl. 60—13)

This invention relates to a system of supercharging for use in connection with Diesel engines, and has for its object to provide means, in connection with a Diesel engine, for synchronously exhausting the consumed gases from the cylinders and injecting into the cylinders clean air for charging purposes. For that purpose there is provided, in connection with the engine, a supercharging pump for forcing air into the cylinders during the exhaust.

It is an object of this invention to provide, in connection with a Diesel engine, means for providing compressed air for supplying supercharged air to the cylinders of the engine, and provide means for operating the supercharging means operatively connected to the engine. This operative connection may be either through a gear connection with some shaft driven by the engine, or a connection to the exhaust manifold.

It is particularly the object of this invention to provide, in connection with the cylinders of a Diesel engine, a pump for supplying supercharged air to the cylinders of the engine, said pump having an operating shaft upon which there is mounted a turbine operated by the exhaust as it is discharged from the engine.

These and other advantages will appear from the following description taken in connection with the drawings, such as:

To provide a supercharger for a multiple cylinder Diesel engine.

To place in a single unitary construction a small compass operating from a common shaft the intake and the exhaust from the engine, and the location of the exhaust at the top of the engine where it may pass out of the engine stack and act as an ejector for removing the hot gases from the top of the engine compartment, while the more temperate gases at the bottom of the compartment are introduced into the supercharger.

To use either an electric motor, a mechanical driver from the engine or the engine exhaust to operate the supercharger.

The special feature is to use the exhaust to operate the supercharger because the greater the exhaust the greater the demand for supercharged incoming air to operate the engine. At the same time, the greater the exhaust resulting from an increased power demand on the engine, the greater is the heating effect of the engine upon its compartment, the greater the injector action created by this exhaust in the exhaust stack, the greater the withdrawal of heated air from the engine compartment through this stack, the greater the inrush of air through the radiator into the partial vacuum thus created in the compartment, the greater the cooling of the water in the radiator, and hence the greater the cooling of the engine. Meanwhile, in the rearward end of the engine compartment remote from the radiator the air heated by contact with the engine rises and is drawn out through the stack by the same injector action, whereupon fresh air from the vicinity of the radiator is drawn in by the partial vacuum thus created, thereby also ventilating the rearward end of the compartment.

Referring to the drawings:

Figure 1 shows a section through a Diesel engine casing, showing in front elevation the supercharging apparatus connected thereto.

Figure 2 is a vertical longitudinal section through the supercharger and a part of the engine casing.

Figure 3 shows a supercharger in which the rotor is operated by means of a separate electric motor.

Figure 4 shows a supercharger in which the rotor is operated by an operating shaft driven by the engine.

Figure 5 is a vertical longitudinal section through the engine casing, showing diagrammatically the relative arrangement of the radiator, the supercharger and the engine, together with the connections therebetween.

The numeral 1 is used to designate the engine casing, and 1a the radiator. This casing forms a closure for the engine 20 and also the supercharger so that the air injected into the engine cylinders 21 by means of the supercharger is warm because it is taken from around the engine. On the front end of the engine casing and extending upwardly therefrom is an exhaust stack or outlet conduit 2. From the bottom of the radiator 1a the cooling water passes through the check valve 30 and the pipe 22 to the water jackets of the engine cylinders 21, thence through the pipe 23 to the top of the radiator 1a, thence downward through the cellular portions 24 thereof to the bottom, completing the cooling circuit. A pump 25 assists this circulation, and a thermostatic valve 26 by-passes the water through the by-pass line 27 during the warming-up period. This cooling system is disclosed more fully and claimed in my copending application Serial No. 661,102 filed March 14, 1933.

The supercharger is located in the front end of the casing and consists of a pump casing 3 having one or more inlets 4, with air strainers 19 therein, connected to the casing by means of pipes or passageways 4a and an outlet pipe 5, which is used for conducting compressed air to the various cylinders of the engine. An exhaust pipe 6 extends from each cylinder and terminates in an exhaust manifold 7.

To one end of this exhaust manifold and supported on top of the pump casing is an elbow or passageway member 7a, suitably attached to the exhaust manifold and also to the pump casing. Supported on top of the elbow member is an exhaust discharge pipe 8 leading into the exhaust stack or outlet conduit 2. Within the pump casing is a rotary pump 9 in the form of a rotor supported upon a shaft 10 for rotation therewith. This shaft is supported by means of two bearings 11, one at each end, suitably supported by some part of the casing.

Upon the upper end of the rotor shaft is an exhaust-operated turbine 12, having vanes so arranged that when the exhaust gases impinge against the vanes the turbine will rotate, causing the shaft and the pump rotor to rotate, thereby forcing air through the inlet into the casing and out through the pipe 5 for the purpose of supplying fresh air to the cylinders of the engine.

In the form shown in Figures 1 and 2 the pump is operated by means of the turbine 12 and the exhaust from the cylinders. In the form shown in Figure 4 the pump is operated by means of a shaft 13, suitably connected to some part of the engine. This shaft rotates the rotor or pump shaft through gears 14, one located on the shaft 13 and the other on the rotor shaft 15. In the form shown in Figure 3 the pump or rotor is operated by means of an electric motor 16, which has a shaft 17 suitably connected to the pump or rotor shaft.

By having the pump operated by the cylinder exhaust the pump is made responsive to the exhaust. That is, the greater the amount of the exhaust the greater is the speed of the engine and the more air is supplied to the cylinders. The greater the demand for air the greater is its supply by this construction.

It will be understood that I desire to comprehend within my invention such modifications as come within the scope of my claims and my invention.

Having thus fully described my invention, what I claim as new and desire to secure by Letters Patent, is:

1. In a power plant employing an internal combustion engine, an engine, an engine casing, an outlet conduit leading therefrom, a supercharger casing arranged near one end of said engine, a vertically-disposed shaft within said supercharger casing, an exhaust-operated turbine drivingly mounted on said shaft, a blower on said shaft driven by said turbine, an exhaust pipe for conducting the exhaust gases from said engine to said turbine, a compressed air pipe for conducting the compressed air from said blower to said engine, and a turbine discharge conduit, one of said conduits being mounted within the other and spaced therefrom whereby to form an injector to create a suction therein for the purpose of causing air to be withdrawn from said engine casing, and fresh air to be drawn therein for supplying said blower and also for ventilating said casing.

2. In a power plant employing an internal combustion engine, an engine, an engine casing, an outlet conduit leading therefrom, a supercharger casing arranged near one end of said engine, a vertically-disposed shaft within said supercharger casing, an exhaust-operated turbine drivingly mounted on the upper end of said shaft, a blower on the lower end of said shaft and driven by said turbine, an exhaust pipe for conducting the exhaust gases from said engine in an approximately horizontal direction to said turbine, a compressed air pipe for conducting the compressed air from said blower in an approximately horizontal direction to said engine, and a turbine discharge conduit, one of said conduits being mounted within the other and spaced therefrom whereby to form an injector to create a suction therein for the purpose of causing air to be withdrawn from said engine casing and fresh air to be drawn therein for supplying said blower and also for ventilating said casing.

3. In a power plant employing an internal combustion engine, an engine, an engine casing, a radiator at one end of said casing connected to said engine to cool said engine, an outlet conduit leading from said casing, a supercharger casing arranged between said engine and said radiator, a vertically-disposed shaft within said supercharger casing, an exhaust-operated turbine drivingly mounted on said shaft, a blower on said shaft driven by said turbine, an exhaust pipe for conducting the exhaust gases from said engine to said turbine, a compressed air pipe for conducting the compressed air from said blower to said engine, and a turbine discharge conduit, one of said conduits being mounted within the other and spaced therefrom whereby to form an injector to create a suction therein for the purpose of causing air to be withdrawn from said engine casing and fresh air to be drawn therein for supplying said blower, for ventilating said compartment and for enhancing the cooling action of said radiator.

4. In a power plant employing an internal combustion engine, an engine, an engine casing, a radiator at one end of said casing connected to said engine to cool said engine, an outlet conduit leading from said casing, a supercharger casing arranged between said engine and said radiator, a vertically-disposed shaft within said supercharger casing, an exhaust-operated turbine drivingly mounted on the upper end of said shaft, a blower on the lower end of said shaft and driven by said turbine, an exhaust pipe for conducting the exhaust gases from said engine in an approximately horizontal direction to said turbine, a compressed air pipe for conducting the compressed air from said blower in an approximately horizontal direction to said engine, and a turbine discharge conduit, one of said conduits being mounted within the other and spaced therefrom whereby to form an injector to create a suction therein for the purpose of causing air to be withdrawn from said engine casing and fresh air to be drawn therein for supplying said blower, for ventilating said compartment and for enhancing the cooling action of said radiator.

FRANK B. YINGLING.